United States Patent [19]

Vering

[11] Patent Number: 5,199,760
[45] Date of Patent: Apr. 6, 1993

[54] PROFILED SEAL FOR LOWERABLE VEHICLE WINDOW

[75] Inventor: Heinz Vering, Schwelm, Fed. Rep. of Germany

[73] Assignee: Gebr. Happich GmbH, Fed. Rep. of Germany

[21] Appl. No.: 861,617

[22] Filed: Apr. 1, 1992

[30] Foreign Application Priority Data

Apr. 4, 1991 [DE] Fed. Rep. of Germany ....... 4110824

[51] Int. Cl.$^5$ ............................................. B60R 13/06
[52] U.S. Cl. ................. 296/146 J; 296/201; 49/377
[58] Field of Search ............... 296/146 J, 201; 49/377, 49/482

[56] References Cited

U.S. PATENT DOCUMENTS

| 4,635,947 | 1/1987 | Hatayama | 296/146 J |
| 4,949,507 | 8/1990 | Vaughan | 49/428 |
| 5,076,638 | 12/1991 | Andexlinger et al. | 296/146 J |

FOREIGN PATENT DOCUMENTS

| 1960992 | 5/1967 | Fed. Rep. of Germany. |
| 3709612 | 3/1987 | Fed. Rep. of Germany. |

Primary Examiner—Robert R. Song
Attorney, Agent, or Firm—Ostrolenk, Faber, Gerb & Soffen

[57] ABSTRACT

A profiled seal for a lowerable vehicle window pane. The seal includes a holding flank which is engaged by a fastening clamp. An upper sealing lip, which self biases to press outward against the window pane, and a lower sealing lip are attached to the holding flank. A cover lip is attached to the upper end of the upper sealing lip. The free end of the cover lip extends from the upper sealing lip to above the holding flank and passes into a groove which is formed between the top of the holding flank and a separate inner cover strip which extends above and is spaced above the holding flank. A pull band extends between the upper end of the upper sealing lip and the upper end of the holding flank and is developed integrally with the profiled seal. In its stretched condition, the pull band is directed at an acute angle to the cover lip. The pull band prevents the free end of the cover lip from slipping out of the groove when the window pane is lowered completely below the upper sealing lip. A second band between the cover lip and the holding flank seals the space enclosed by the pull band.

8 Claims, 1 Drawing Sheet

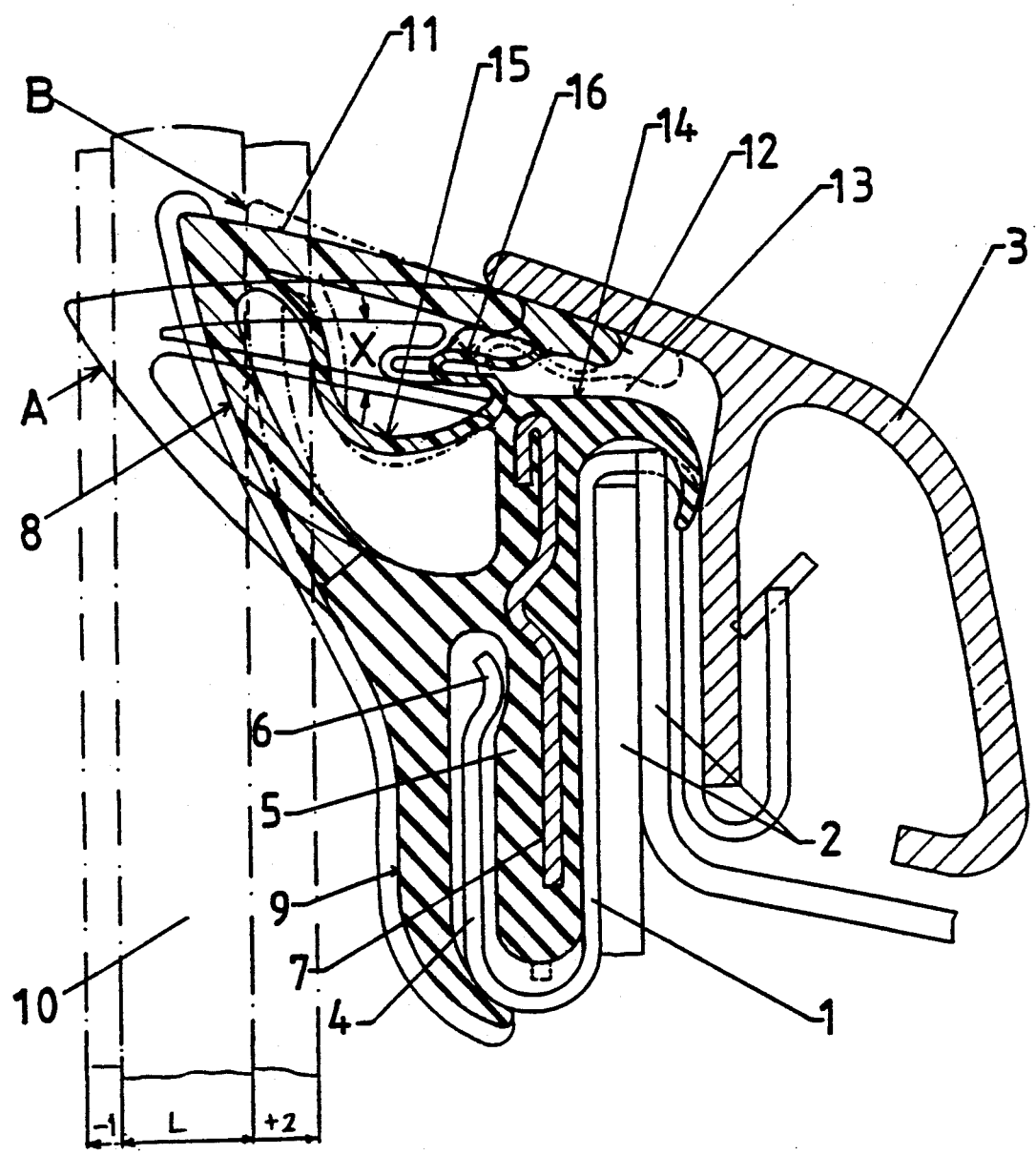

PROFILED SEAL FOR LOWERABLE VEHICLE WINDOW

BACKGROUND OF THE INVENTION

The present invention relates to a profiled seal for being held in a passage slot in a structural part of an automotive vehicle and for sealing a lowerable window pane of the vehicle.

The seal has a stiff holding flank that is partially surrounded and held by a U-shaped section of an attachment clamp. The clamp secures the seal, and particularly the holding flank, on the structural part. The profiled seal comprises, in cross section, an upwardly extending, upper sealing lip which can be applied to press against the window pane, a downwardly extending, lower sealing lip which lies recessed under the upper lip and is below the upper edge of the structural part, and a cover lip which is attached on the upper end of the upper sealing lip and extends away from the window and toward the structural part. The free end of the cover lip extends away from the upper sealing lip to be above the holding flank of the seal, and that free end extends into a groove which is defined between the top of the holding flank and a separate cover strip which is located inward of the seal.

Examples of prior art profiled seals include ones shown in German Published Application OS 37 09 612 A1 and German Utility Model GM 19 60 992.

A conventional profiled seal of the above described type may be developed as a hollow chamber in the region of the upper sealing lip. But, such a seal profile is undesirable for stylistic and functional reasons. This known seal profile can easily either bulge out or else form places of indentation. This would then require greater forces of displacement upon the opening and closing of the window pane. One particular disadvantage of the traditional profiled seal is that the free end of the cover lip can easily slip out of the groove between the holding flank and the cover strip when the window pane is in its fully open position. Due to the absence of support for the upper sealing lip by the window pane, even a slight pressure from above on the sealing lip is sufficient to allow the cover lip to slip out of the groove, which is highly undesirable.

SUMMARY OF THE INVENTION

It is an object of the present invention to improve a profiled seal of the aforementioned type with respect to stylistic and functional requirements and to try to ensure that the free end of the sealing lip does not unintentionally slide out of the groove between the top of the holding flank and a cover strip extending toward the window, when the window pane is in its lowered position.

According to the invention, a pull band is integrally formed with the profiled seal, and the pull band extends between the upper end of the upper sealing lip and the upper end of the holding flank of the profiled seal. In its stretched condition, the pull band is directed at an acute angle to the cover lip to prevent the free end of the cover lip from slipping out of the groove when the window pane is lowered completely below the upper sealing lip. The pull band may be a relatively thin film of flexible material, with a thickness or stiffness such that the function and movement of the sealing profile is not impaired due to the presence of the pull band.

The profiled seal of the invention can be further improved by providing a second band also of one piece integrally with the seal and extending between the region of the free end of the cover lip and the upper end of the holding flank to prevent the penetration of water, particles of dirt, or the like, into the space between the cover lip and the pull band.

Other objects, features and advantages of the present invention will become apparent from the following description of an embodiment of the invention which refers to the accompanying drawing.

BRIEF DESCRIPTION OF THE DRAWING

The drawing shows a cross section through a profiled seal of the invention.

DETAILED DESCRIPTION OF THE PREFERRED EMBODIMENT

The drawing shows a profiled seal in the form of a movable window pane engaging seal supported by a structural part of an automotive vehicle. The profiled seal is fastened by a stiff fastening clamp 1 to a wall 2 of the structural part. In cross section, the fastening clamp 1 is bent into three U-shapes which are bent in opposite directions, producing somewhat of a W-shape. The central, downwardly open, U-shaped part is clamped onto the wall of the structural part from above. Within the inward, upwardly open, U-shaped end section, the clamp receives a supporting rib of a cover strip 3, which strip has an ornamental function. In the opposite, outward, upwardly open, U-shaped end section, a U-arm 4 of the fastening clamp 1 grips a holding flank 5 of the profiled seal. The holding flank 5 extends vertically along the movement direction of the window pane. A nose 6 which is formed on the free end of the U-arm 4 engages into a notch in the holding flank 5 for holding fast to the flank 5. The holding flank 5 is stiffened by a metal insert 7 incorporated in it.

The entire profiled seal, except for a below described surface coating, is developed as a single extrusion molding and is preferably comprised of elastomeric material. A hard/soft material combination is indicated by different hatching, with the insert 7 being in the harder material region.

The profiled seal has two sealing lips 8 and 9 attached to and extending outward toward the window pane from the holding flank and lying one above the other along the movement path of the window pane 10. The upwardly extending, upper sealing lip 8 is resiliently self biased outward to press against the window pane 10, and it prevents water and dirt from entering unimpeded into the structural part upon the lowering of the window pane 10. The downwardly extending, lower sealing lip 9 screens off the fastening clamp 1 from water which has penetrated. In addition, on rare occasions, especially due to extremes of tolerances, the lower lip 9 may apply itself against the window pane, particularly when the window pane 10 has been lowered below the upper sealing lip 8. Because there is contact between the upper lip and the pane and because there may be contact between the lower lip and the pane, the outer surface of both of the upper and lower lips is coated with a flocking material or with a smooth enamel.

The upper end of the upper sealing lip 8 carries an integral cover lip 11 which extends outward from the upper sealing lip 8 at the window to be above the holding flank 5. The cover lip has a free end 12 which extends into a groove 13 which is developed between the top end 14 of the holding flank 5 and the part of the cover strip 3 that extends over the holding flank.

On the upper sealing lip 8, on its rear, in the region of its upper end, and in the transition region from the upper lip 8 to the cover lip 11, there is integrally formed one end of a flexible elongate pull band 15. The other end of the pull band 15 is integrally formed at the top end 14 of the holding flank 5. As it becomes fully extended, the pull band 15 attached to the stationary holding flank 5 pulls inward on the upper lip 8 and prevents the attached cover lip 11 from moving far enough outward to slip out of the groove 13 when the window pane 10 has been lowered completely below the parts of the upper sealing lip 8 which press against the window pane. With the window pane 10 completely lowered, the upper sealing lip 8 assumes the outward position A, which is indicated in dot-dash line, in which the pull band 15 is stretched out to extend linearly between the upper sealing lip 8 and the head end 14 of the holding flank 5. This prevents the cover lip 11 from being pulled completely out of the groove 13, unless by intentionally overstretching the pull band. In its stretched condition, the pull band 15 forms an acute angle X with the direction of extension of the cover lip 11. When the upper sealing lip 8 is applied in a sealing fashion against the window pane 10, the flexible pull band 15 slackens and forms a loop, as seen in cross section.

The function of the profiled seal could possibly be impaired by water, particles of dirt, or the like, which penetrate into the groove 13 and from there into the space between the cover lip 11 and the pull band 15. To prevent this, there is a second, relatively thin band 16 which is integrally formed in one piece with and between the region of the free end 12 of the cover lip and the upper end 14 of the holding flank 5.

The solid lines of the profiled seal show the basic position of this profiled part upon its manufacture, e.g. by extrusion. The dash-dot line A shows the position of the profiled seal when the window pane 10 is open down past the sealing lip 8, while the other dash-dot line B shows the position of the profiled seal with the window 10 closed and the seal pressing on the window.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A profiled seal for attachment in a passage slot of a structural part of an automotive vehicle for sealing a raisable and lowerable window pane located in the vehicle near the structural part, the profiled seal comprising:
   a stiff holding flank spaced a distance from the window, the holding flank having a top;
   a fastening clamp on the holding flank and extending to the structural part for securing the profiled seal on the structural part;
   an upwardly extending upper sealing lip attached to the holding flank and having an upper free end which self biases outwardly so that the upper lip can be applied against and can press against the window pane;
   a downwardly extending, lower sealing lip also attached to the holding flank and extending downwardly along the holding flank;
   a cover lip attached to the upper free end of the upper sealing lip, the cover lip extending from the upper sealing lip away from the window pane and generally above the holding flank;
   a cover strip located generally inward from the holding flank and away from the window, the cover strip including a portion that extends toward the window and is above and spaced away from the top of the holding flank for defining a groove between the cover strip and the top of the holding flank; the cover lip having a free end away from the window pane which extends into the groove;
   a pull band extending between the upper end of the upper sealing lip and the holding flank near the top thereof, the pull band being flexible and being of a length that the pull band is stretched when the window pane is lowered below the upper sealing lip and the upper sealing lip normally self biases outward beyond the position where it would first contact the window pane; and the pull band being flexible to flex and fold slightly when the window pane is raised to press the upper sealing lip inward toward the holding flank.

2. The profiled seal of claim 1, wherein the stretched pull band is directed at an acute angle to the direction of extension of the cover lip toward the groove.

3. The profiled seal of claim 2, wherein the pull band is of one piece with the profiled seal and is integrated with the upper sealing lip and with the holding flank.

4. The profiled seal of claim 1, wherein the lower sealing lip is below the top of the structural part and extends downwardly next to the holding flank.

5. The profiled seal of claim 4, wherein the holding flank extends a distance along the direction of movement of the lowerable window pane.

6. The profiled seal of claim 1, wherein the clamp has a generally U-shaped section and the holding flank is shaped to fit into the U shaped section; and the clamp further extending through a passage slot in the structural part of the vehicle.

7. The profiled seal of claim 1, further comprising a second band attached generally in the region of the free end of the cover lip and at the upper end of the holding flank and extending between them, the second band being shaped and positioned for preventing penetration of water, dirt, or the like into the space between the cover lip and the pull band.

8. The profiled seal of claim 7, wherein the second band is of one piece with the cover lip and the holding flank.

* * * * *